United States Patent [19]

Ledford, Jr.

[11] Patent Number: 4,693,155
[45] Date of Patent: Sep. 15, 1987

[54] TABLE SAW ATTACHMENT FOR CUTTING CIRCLES

[76] Inventor: Hazen Ledford, Jr., 639 Church Rd., Bakersville, N.C. 28705

[21] Appl. No.: 856,656

[22] Filed: Apr. 28, 1986

[51] Int. Cl.⁴ .................. B23D 55/04; B27B 13/00
[52] U.S. Cl. .................................. 83/410; 83/411 R; 83/423; 83/733; 83/809
[58] Field of Search ............... 83/410, 411 R, 439, 83/733, 423, 809

[56] References Cited

U.S. PATENT DOCUMENTS

| | | | |
|---|---|---|---|
| 724,433 | 4/1903 | Catudal | 83/439 X |
| 1,001,338 | 8/1911 | Bernstein | 83/439 X |
| 1,420,218 | 6/1922 | Richards | 83/411 R |
| 1,426,932 | 8/1922 | Wallace | 83/410 |
| 2,157,310 | 5/1939 | Ward | 83/439 |
| 2,696,230 | 12/1954 | Libby | 83/439 |
| 2,720,897 | 10/1955 | Kairath | 83/439 |
| 3,995,521 | 12/1976 | Raphael | 83/733 X |
| 4,027,566 | 6/1977 | Harrill | 83/439 X |
| 4,244,253 | 1/1981 | Flanigan | 83/733 X |
| 4,353,399 | 10/1982 | Harris | 144/2 R |

Primary Examiner—Frank T. Yost
Attorney, Agent, or Firm—Bell, Seltzer, Park & Gibson

[57] ABSTRACT

A saw attachment for supporting and moving a workpiece when forming circles or other arcuate shapes is provided which is characterized by the relative ease of its operation and the degree of precision which may be achieved through its use particularly in fashioning circles from workpieces of disparate dimensions. The attachment includes a frame, a movable carriage mounting a centering pin, means mounting the carriage on the frame for moving the carriage along a path of travel, and actuating means for moving the carriage in predetermined increments along a path of travel. The means mounting the carriage defines a path of travel for the carriage which may be constrained through the use of stop means for further enhancing the precision and reproducibility achievable with an attachment of this type.

8 Claims, 8 Drawing Figures

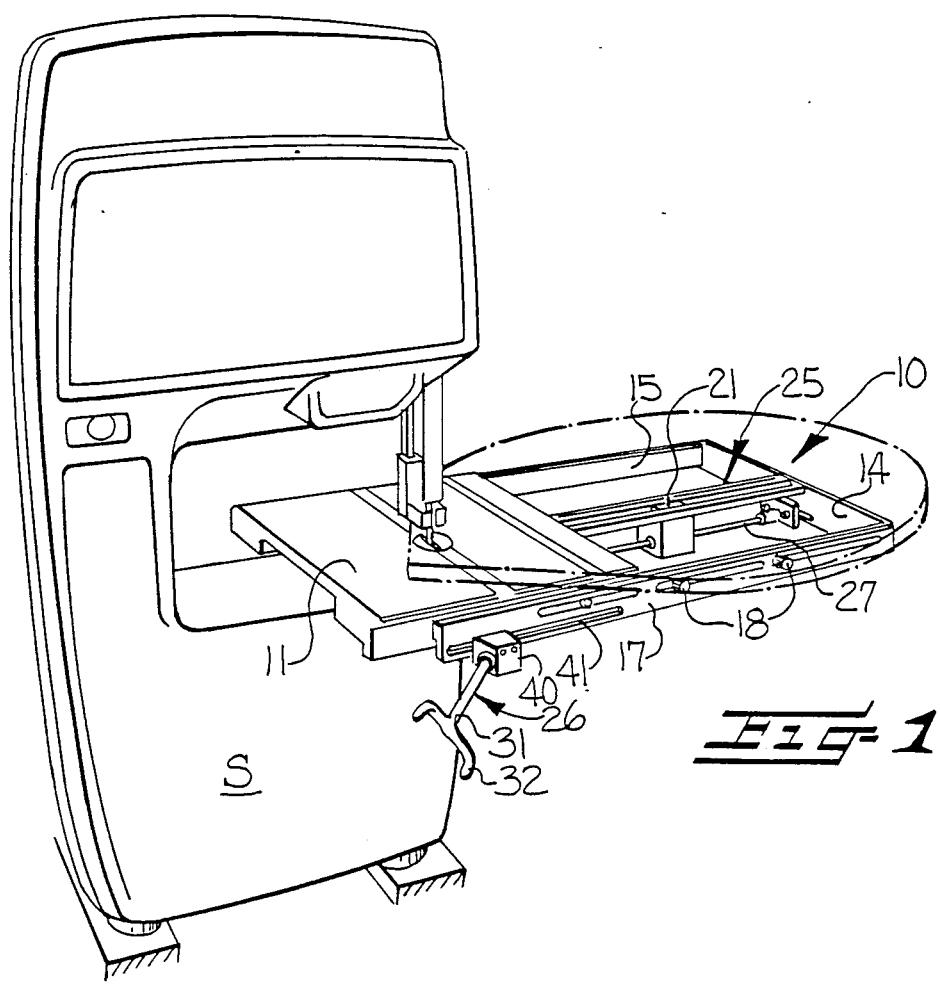
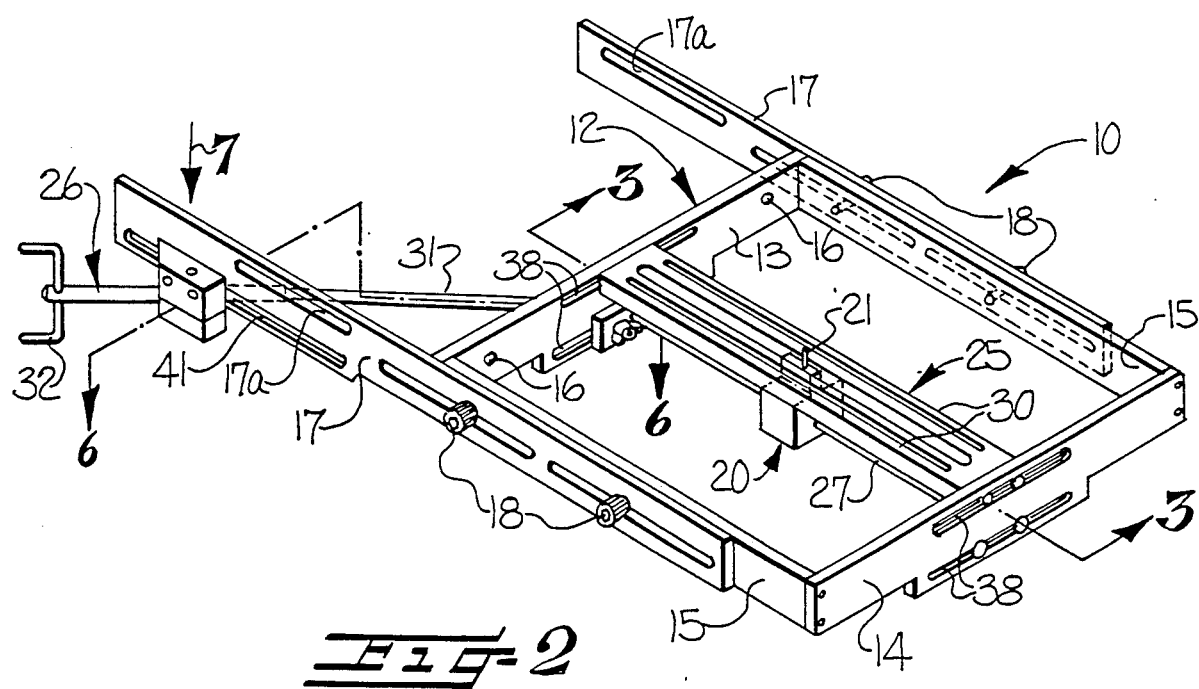

TABLE SAW ATTACHMENT FOR CUTTING CIRCLES

BACKGROUND OF THE INVENTION

This invention relates to an attachment for use in connection with a cutting apparatus, such as a band saw or the like, which is adapted for both supporting and moving a workpiece along a path of travel into contact with a blade when forming circles or other arcuate shapes from the workpiece.

In forming circles or other arcuate shapes from a square or rectangular workpiece, for example, it is necessary to utilize an attachment since conventional table saws such as a band saw are not designed expressly for this purpose. These attachments typically include a track of some type on which a movable slide mounting a centering pin is carried. In use, the workpiece is mounted on the slide through an aperture formed in the workpiece which receives the centering pin. The piece is moved into position for contact with the cutting means and is then manually rotated about the centering pin to form a circle, for example. Representative attachments are described in U.S. Pat. Nos. 2,696,230; 4,027,566; and 4,244,253.

Each of the representative devices in the art possesses a common limitation in that no means are provided for advancing the slide carrying the workpiece in predetermined increments into or out of engagement with the blade or cutting means. Consequently, the precision achievable in the rate of movement of the piece is dependent upon the manual dexterity of the operator who must both move the piece along the track while rotating the same to form a circle or alternatively to form other arcuate shapes using a template, for example. Manual feeding will generally cause binding of the blade since the workpiece is often advanced too rapidly. In addition, in forming products having arcuate shapes as part of an overall pattern, the precision needed in gradually advancing the piece to form the arcuate shape cannot be achieved generally.

A further limitation is possessed by devices equipped with a track and slide in that the slide must be locked in a predetermined and fixed position prior to fabricating circles of a preselected diameter. Consequently, all ability to move the piece into or out of engagement with the blade is lost entirely in this application. Therefore, disparately shaped and dimensioned workpieces must first be fashioned into the approximate dimensions of the finished product prior to placement on the centering pin with significant attendant losses in productivity.

It is therefore an object of the present invention to provide an attachment for use with band saws or the like which includes means for supporting and incrementally moving the workpiece along a path of travel into or out of engagement with a blade to more precisely control the cutting process, particularly when using a template to form arcuate shapes. It is also an object to provide a device which is effective for moving the workpiece as described but which also has the ability to provide precise circles of a predetermined diameter, even though each distinct workpiece is of a disparate shape or dimension.

It is also an object of the invention to provide an attachment which is laterally adjustable in order to accommodate varying blade widths.

It is an additional object of the invention to provide an attachment which may be extended away from a worktable on which it is mounted for use in forming relatively large circular objects.

SUMMARY OF THE INVENTION

The foregoing objects are achieved by an attachment which includes a frame adapted for mounting on the worktable of a saw, a movable carriage mounting a workpiece centering pin, means mounting the carriage on the frame for movement along a predetermined path of travel, and actuating means operatively connected to the carriage for moving the carriage along the path in predetermined increments. The means mounting the carriage defines the path of travel for the carriage while the actuating means enables the user to accurately adjust the position of the carriage and the workpiece along that path in precise, predetermined increments relative to the blade or other cutting means. In this fashion, the workpiece may be precisely and easily cut with the blade while any binding of the blade is avoided.

In addition, adjustable stop means are provided to define or limit the path of travel of the carriage while still permitting movements of the carriage through the use of the actuating means. Consequently, the stop means may be positioned prior to initiating contact between the blade and the piece using the actuating means, whereupon excess waste may be removed from disparately dimensioned workpieces by spiral cutting with the finished circle(s) all having the precise, desired finished diameter.

Other features of the invention include lateral adjustment means for changing the relative position of the carriage and workpiece centering pin to form various arcuate shapes or to accommodate variances in saw blade configurations and widths as well as extension means which permit movements of the entire device relative to the worktable with ease so as to accommodate large workpieces while still retaining the advantages described above.

In the Drawings

Additional features and attendant advantages of the invention will be described in detail hereinbelow in connection with the drawings in which:

FIG. 1 is a perspective view of a preferred embodiment of the novel attachment mounted for use on the worktable of a band saw;

FIG. 2 is an additional perspective view of the same attachment removed from the band saw to depict the various structural elements thereof;

DETAILED DESCRIPTION

Figure 3:
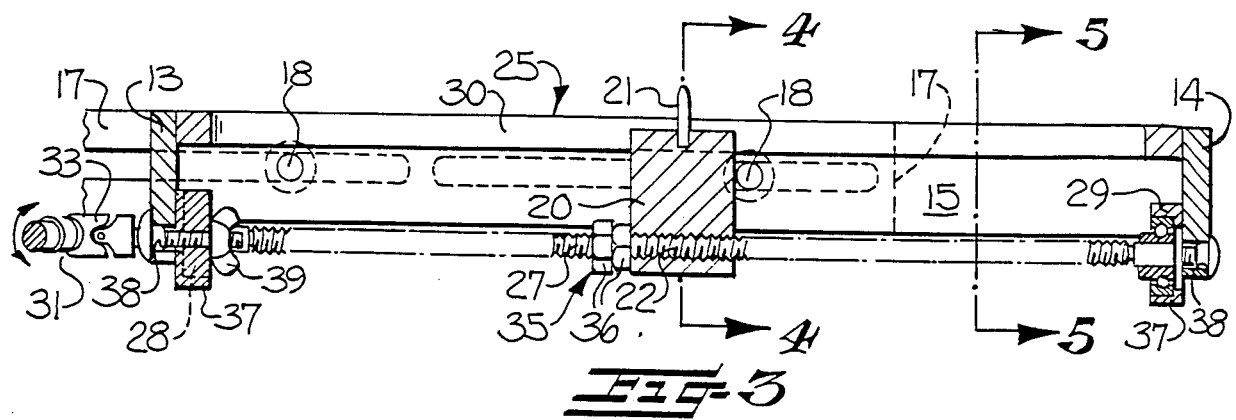
FIG. 3 is a cross-sectional view of the attachment taken along the line 3—3 in FIG. 2 to expose various structural details thereof including the carriage and means mounting the carriage.

As shown in FIG. 1 the attachment 10 is adapted for mounting on the worktable 11 of a cutting apparatus which, for purposes of illustration in the drawings, comprises a band saw S. As best seen in FIG. 2, the attachment includes a frame 12 which preferably includes a rear plate 13, front plate 14, and side plates 15. The frame 12 may be formed from any suitable starting material including flat steel bars which may be joined in any suitable manner including by welding or preferably by tapped threads in the bars and set screws provided therein. The rear plate 13 and the worktable 11, if necessary, are preferably slotted to provide at least a pair of apertures therethrough for receiving table attachment bolts 16 so that the frame 12 may be releasably mounted on the worktable 11 for use. In addition, extension means 17 are preferably provided and are depicted as a pair of flat steel bars which are suitably slotted to receive extension slide bolts 18 and are also adapted for attachment to the worktable 11 through the apertures 17a for reasons discussed more fully hereinbelow.

A carriage 20 mounting a centering pin 21 is provided as well as means 25 mounting the carriage 20 on the frame 12 for movement along a predetermined path of travel. The particular means 25 mounting the carriage 20 may vary broadly, but the preferred means 25 mounting the carriage 20, and as depicted in the drawings, comprises a threaded rod 27 having journaled ends mounted in a pair of bearings 28 and 29 (FIG. 3) and guide means 30 which preferably contact upper portions of the carriage 20. The carriage 20 is provided with a threaded aperture 22 which receives the threads of the rod 27 (FIG. 4) therethrough.

An actuating means 26 is provided for moving carriage 20 along its path of travel, and may include, by way of illustration, hydraulic arrangements including a piston mounting the carriage or an electric powered arrangement using a chain drive to define the path of travel or track for the carriage. Actuating means 26 rotates rod 27 and such rotation causes the carriage 20, which itself is prevented from rotating in the preferred embodiment by the guide means 30, to move along the path defined by mounting means 25 in either direction depending on the direction of rotation of the actuating means 26 (FIG. 3). In addition, the carriage 20 will move along the path in increments defined by the threads on the rod 27 and in aperture 22 and for a distance determined by the number of rotations of the actuating means 26. The actuating means 26 is depicted in its preferred form as a shaft 31 and a handle 32 but may take any number of alternative known forms including that of an electric motor with appropriate controls including a rheostat, for example.

The selection of the thread size on the rod 27 and the threaded aperture 22 in the preferred embodiment determines the size of the incremental advance of the carriage 20 with each rotation or engagement of the handle 32 on the actuating means 26. A particular preferred size is ⅜"×16 for the rod 27 which will advance the carriage 20 at a relatively slight incremental rate to avoid binding the blade with the workpiece on a band saw.

Figure 5:
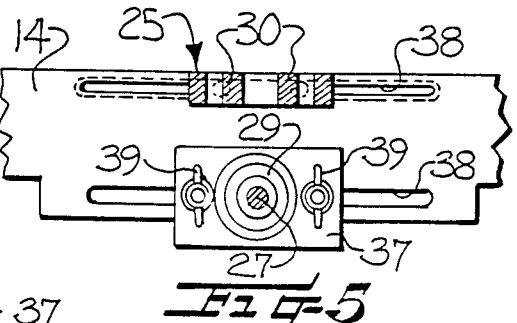
FIG. 5 is a fragmentary cross-sectional view of a portion of the attachment taken along the line 5—5 in FIG. 3, and depicting still further details thereof when seen in the direction of the corresponding arrows provided in FIG. 3.

The means mounting the carriage 25 is preferably laterally adjustable to accommodate a variety of blade sizes and configurations and to facilitate the formation of non-circular arcuate shapes in the workpieces. To this end, the bearings 28 and 29 receiving the ends of rod 27 are preferably mounted in flat steel bars 37 (FIG. 3) which are in turn preferably releasably secured to the respective plates of the frame 12 through the use of bolts and wing nuts 39 (FIG. 2 and 3). Similarly, the guide means 30 is preferably releasably secured to the frame 12, while channels 38 (FIGS. 2 and 5) are preferably provided in the rear plate 13 and front plate 14 so that the position of the rod 27, the carriage 20, and the guide means 30 may be adjusted in a direction perpendicular to the path of travel of the carriage 20 simply by loosening the wing nuts 39 and repositioning the same.

Figure 4:
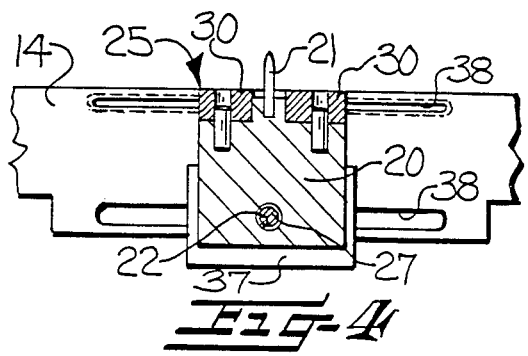
FIG. 4 is a fragmentary cross-sectional view taken through the carriage and means mounting the carriage taken along the line 4—4 in FIG. 3 and depicting a detailed view thereof when seen in the direction of the arrows indicated in FIG. 3.

The guide means 30 of the means 25 mounting the carriage 20 is preferably provided not only to prevent the rotation of the carriage 20 in the preferred embodiment as alluded to above, but also to serve as added security to ensure that the path of the carriage 20 is true to the blade as well as to protect against deflections of the workpiece carried on the centering pin 21 during operation. To this end, upper portions of the carriage 20 preferably extend into a channel defined by the guide means 30 as shown in FIG. 4 to securely protect the pin 21 against deflections. And, since the relative position of the guide means 30 is preferably laterally adjustable, this added security is available over a range of operating parameters on a variety of differing saw constructions.

Stop means 35 are preferably provided and is represented in the drawings as a pair of nuts 36 which may be positioned anywhere along the length of the threaded rod 27. In this manner, the final desired diameter of a circle, for example, may be established by suitably positioning the nuts 36 along the length of the threaded rod 27 while the means mounting the carriage 25 remains operable for advancing or withdrawing the workpiece within the more limited range defined by the stop means 35. The dimensions of a particular workpiece in repetitive or mass production thus becomes insignificant since each piece may be accurately and similarly fashioned without extensive preliminary preparation of the workpieces themselves. On the other hand, and as alluded to above, prior attachments providing a "slide" and a centering pin at most provide means for fixing or locking the position of the slide at one point along a track through the use of a set screw or the like whereupon the piece cannot be moved at all. These limitations are overcome by the present apparatus as disclosed herein.

Figure 6:
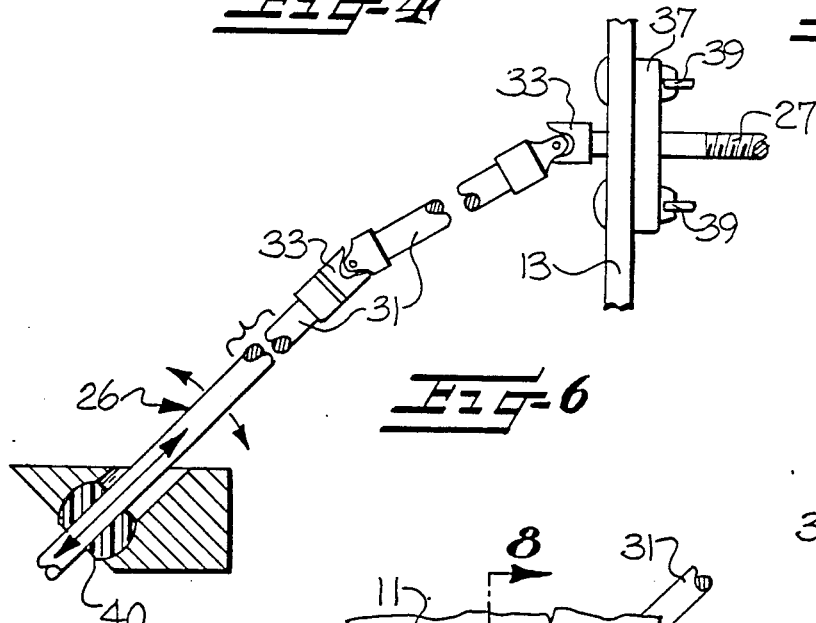
FIG. 6 is a fragmentary top view of the attachment with portions cutaway along the line 6—6 in FIG. 2 to depict the structure of the preferred form of actuating means used in connection with the means mounting the carriage.
Figure 8:
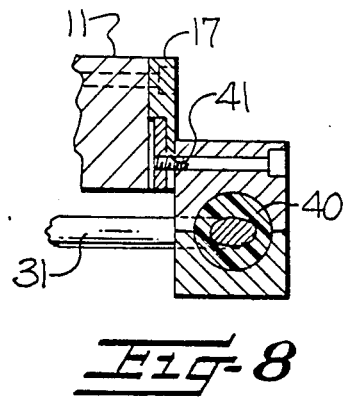
FIG. 8 is a cross-sectional view of the same portion of the attachment taken along the line 8—8 in FIG. 7.
Figure 7:
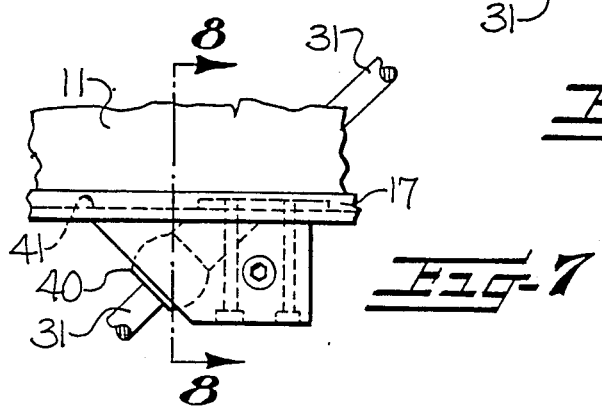
FIG. 7 is a top view of a portion of the attachment as indicated by the arrow 7 in FIG. 2.

As best seen in FIG. 6, the actuating means 26 is preferably articulable by providing universal joints 33 in the shaft 31 so that as the distance between the carriage 20 and the cutting means or blade is increased or decreased, the actuating means 26 will operate smoothly during use even though the handle 32 will be positioned at various different angles to the means mounting the carriage 25. Also, self-aligning bearing means 40 (FIGS. 6 through 8) is preferably provided through which the shaft 31 is guided to further ease the operation of the attachment. That is, as the distance between the carriage 20 and the blade is increased, the smooth operation of the actuating means 26 is assured by the cooperation of the articulated shaft 31, the preferred universal joints 33, and the self-aligning bearing means 40 (FIG. 6). This is an especially desired feature where the optional extension means 17 is utilized as described below.

As noted above, the attachment 10 is preferably mounted on the worktable 11 by table attachment bolts 16 inserted through apertures in the attachment 10 and worktable 11 as well as by bolts inserted through the apertures 17a in the extension means 17 (FIG. 2) and worktable 11. In order to increase the effective range of the device to form larger circles, the table attachment bolts 16 are removed and the extension slide bolts 18 are loosened whereupon the entire frame 12 may be extended away from the worktable. In this manner, larger workpieces may be fashioned into circles while retaining all of the features and attendant the advantages of the device. Through the use of the extension means 17 the device depicted in the drawings may be used to fabricate circles of a maximum diameter of 50½ inches while in the unextended state, it forms circles up to 38 inches in diameter. As alluded to above, the use of an articulated shaft 31 and self-aligning bearing means 40 ensures smooth operation and control of the carriage 20 carrying the centering pin 21 even in the extended state. In addition a slot 41 is preferably provided in the extension bars 17 to assist the functioning of the actuating means 26 and the self-aligning bearing means 40 over the complete range of operation.

As can readily be seen from the foregoing description of the representative embodiments of the invention, the above-described saw attachment provides significant advantages over those heretofore known in the art. While the drawings and specification serve to describe the preferred embodiments only, they should not be utilized for purposes of unduly limiting the scope of the present invention which scope is defined solely by the appended claims.

That which is claimed is:

1. In an apparatus for cutting circles or other arcuate shapes from workpieces which includes cutting means for cutting the workpieces and a worktable, the improvement therein comprising attachment means for supporting workpieces of disparate size and shape for cutting without the necessity of prefashioning the workpiece and comprising
    a frame mounted on said worktable,
    a carriage mounting a workpiece centering pin,
    means mounting said carriage on said frame for movement along a predetermined path of travel toward and away from said cutting means,
    actuating means for moving said carriage along said path of travel in predetermined increments during cutting of a workpiece, and
    adjustable stop means cooperating with said carriage mounting means for adjusting the length of said path of travel while concurrently permitting incremental movement of the carriage along the path of travel defined by said stop means whereby workpieces of disparate size and shape may be supported and precisely cut into circles or other arcuate shapes of predetermined dimensions without the necessity of prefashioning the workpieces.

2. An apparatus according to claim 1 further comprising extension means attached to said worktable and releasably connected to said frame for supporting said attachment means when the attachment means is moved away from the worktable to accommodate relatively large workpieces.

3. An apparatus according to claim 1 wherein said means mounting said carriage includes lateral adjustment means for changing the position of said carriage and workpiece centering pin in a direction substantially perpendicular to said predetermined path of travel to further facilitate the formation of arcuate shapes from the workpieces and for accommodating a variety of cutting means configurations or widths.

4. An apparatus according to claim 1 wherein said means mounting said carriage includes an elongate threaded rod and wherein said carriage includes a threaded aperture receiving the threads of said rod therethrough.

5. An attachment for a band saw or the like for supporting workpieces while cutting circles or other arcuate shapes therefrom and which is characterized by the ability to support workpieces of disparate size and shape for cutting without the necessity of pre-fashioning the workpieces, said attachment including
    a frame adapted to be mounted on a band saw or the like,
    a carriage mounting a workpiece centering pin with said carriage including a threaded aperture extending therethrough,
    means mounting said carriage on said frame for movement along a predetermined path of travel and comprising an elongate threaded rod extending through the threaded aperture in said carriage,
    guide means connected to said frame and contacting upper portions of said carriage for preventing lateral displacement of the carriage and the centering pin mounted thereon, and
    actuating means operatively connected to said carriage for moving said carriage along said predtermined path of travel in predtermined increments during cutting of the workpiece.

6. An attachment according to claim 5 further comprising stop means for adjusting the maximum length of said path of travel to thereby establish the finished diameter of circles formed with said attachment and lateral adjustment means adapted for chnaging the position of said carriage and workpiece centering pin in a direction substantially perpendicular to said path of travel to accommodate a variety of different types of band saws or the like.

7. An attachment according to claim 5 further comprising extension means adapted for attachment to the worktable of a band saw or the like and releasably connected to said frame for supporting the attachment when the attachment is separated and extended away from the worktable to accommodate relatively large workpieces.

8. An attachment according to claim 7 wherein said actuating means comprises an elongate articulate shaft and a handle extending at a tangent from said path of travel whereby the carriage may be moved along said predetermined path of travel with relative ease even when said attachment is extended away from a worktable through use of said extension means.

* * * * *